(12) United States Patent
Zhan

(10) Patent No.: US 10,922,511 B2
(45) Date of Patent: Feb. 16, 2021

(54) EMBEDDED FINGERPRINT RECOGNITION DEVICE BASED ON MOBILE TERMINAL

(71) Applicant: HuiZhou TCL Mobile Communication Co., Ltd., HuiZhou (CN)

(72) Inventor: Hongbin Zhan, HuiZhou (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 0 days.

(21) Appl. No.: 16/464,698

(22) PCT Filed: Oct. 31, 2017

(86) PCT No.: PCT/CN2017/108699
§ 371 (c)(1),
(2) Date: May 29, 2019

(87) PCT Pub. No.: WO2018/099231
PCT Pub. Date: Jun. 7, 2018

(65) Prior Publication Data
US 2019/0325192 A1    Oct. 24, 2019

(30) Foreign Application Priority Data
Nov. 29, 2016 (CN) .......................... 2016 1 1072837

(51) Int. Cl.
*G06F 3/041* (2006.01)
*G06K 9/00* (2006.01)

(52) U.S. Cl.
CPC ......... *G06K 9/00006* (2013.01); *G06F 3/041* (2013.01)

(58) Field of Classification Search
CPC ....................................... G06K 9/00006–00053
See application file for complete search history.

(56) References Cited

U.S. PATENT DOCUMENTS

| 2018/0052561 A1* | 2/2018 | Wu ..................... G06K 9/00013 |
| 2019/0095004 A1* | 3/2019 | Son ..................... H03K 17/962 |
| 2019/0208043 A1* | 7/2019 | Cha ..................... H04M 1/02 |

FOREIGN PATENT DOCUMENTS

| CN | 104951766 | 9/2015 |
| CN | 105116968 | 12/2015 |
| CN | 105825165 | 8/2016 |
| CN | 106778542 | 5/2017 |
| WO | WO 2016/184346 | 11/2016 |
| WO | WO 2018/099231 | 6/2018 |

OTHER PUBLICATIONS

International Search Report and the Written Opinion dated Jan. 25, 2018 From the International Searching Authority Re. Application No. PCT/CN2017/108699. (10 Pages).

* cited by examiner

*Primary Examiner* — Joseph R Haley

(57) ABSTRACT

An embedded fingerprint recognition device based on a mobile terminal includes a touch screen module, the touch screen module including a touch panel, the touch panel including a groove defined therein; and a fingerprint recognition module embedded and disposed in the groove.

14 Claims, 4 Drawing Sheets

EMBEDDED FINGERPRINT RECOGNITION DEVICE BASED ON MOBILE TERMINAL

RELATED APPLICATIONS

This application is a National Phase of PCT Patent Application No. PCT/CN2017/108699 having International filing date of Oct. 31, 2017, which claims the benefit of priority of Chinese Patent Application No. 201611072837.2 filed on Nov. 29, 2016. The contents of the above applications are all incorporated by reference as if fully set forth herein in their entirety.

FIELD AND BACKGROUND OF THE INVENTION

The present disclosure relates to a mobile terminal technology field, and more particularly to an embedded fingerprint recognition device based on a mobile terminal.

With the rapid development of mobile terminal technology, various mobile terminals, for example, mobile phones, have been widespread. Moreover, functions are increasing continuously. The new functions provide convenience for users and are popular with the users. For example, at present, mobile phones include virtual buttons for fingerprint recognition. The fingerprint recognition of the users can be performed by touching the virtual buttons.

Currently, a fingerprint recognition module is to dispose a fingerprint recognition sensor under a glass cover. However, since the fingerprint recognition module is thicker and assembling is complicated, a thickness of a mobile terminal and a length are increased.

Consequently, prior art needs to be improved and developed.

SUMMARY OF THE INVENTION

Embodiments of the present disclosure provide an embedded fingerprint recognition device based on a mobile terminal capable of solving the problem that a thickness of a mobile terminal and a length are increased in the prior art because the conventional fingerprint recognition module is thicker and assembling is complicated.

In a first aspect, an embodiment of the present disclosure provides an embedded fingerprint recognition device based on a mobile terminal. The embedded fingerprint recognition device based on the mobile terminal includes: a touch screen module, the touch screen module including a touch panel, the touch panel including a groove defined therein; a touch screen sensor attached to one side of the touch screen near the mobile terminal; and a fingerprint recognition module embedded and disposed in the groove; the groove including a first groove part disposed in the one side of the touch screen attached on the mobile terminal; the fingerprint recognition module including a flexible circuit board disposed in the first groove part; the groove further including a second groove part disposed in the other side of the touch screen away from the mobile terminal and connected to the first groove part; the fingerprint recognition module further including a fingerprint recognition sensor disposed in the second groove part; wherein a decorative ring is printed on the second groove part.

Further, the touch screen includes first oblique edge parts disposed therein, so that a shape of the first groove part is a trapezoid having a long inner side and a short outer side in a longitudinal view.

Further, the touch screen further includes second oblique edge parts disposed therein, so that a shape of the second groove part is a trapezoid having a long inner side and a short outer side in the longitudinal view.

Further, the touch screen further includes third oblique edge parts disposed therein and disposed symmetrically with the second oblique edge parts in a horizontal direction.

In a second aspect, an embodiment of the present disclosure provides an embedded fingerprint recognition device based on a mobile terminal. The embedded fingerprint recognition device based on the mobile terminal includes: a touch screen module, the touch screen module including a touch panel, the touch panel including a groove defined therein; and a fingerprint recognition module embedded and disposed in the groove.

Further, the groove includes a first groove part disposed in one side of the touch screen attached on the mobile terminal; the fingerprint recognition module includes a flexible circuit board disposed in the first groove part.

Further, the fingerprint recognition module further includes a strengthening steel plate attached to the flexible circuit board.

Further, the groove further includes a second groove part disposed in the other side of the touch screen away from the mobile terminal and connected to the first groove part; the fingerprint recognition module further includes a fingerprint recognition sensor disposed in the second groove part.

Further, the touch screen includes first oblique edge parts disposed therein, so that a shape of the first groove part is a trapezoid having a long inner side and a short outer side in a longitudinal view.

Further, the touch screen further includes second oblique edge parts disposed therein, so that a shape of the second groove part is a trapezoid having a long inner side and a short outer side in the longitudinal view.

Further, the touch screen further includes third oblique edge parts disposed therein and disposed symmetrically with the second oblique edge parts in a horizontal direction.

Further, the second oblique edge parts have a color which is changed by silk printing and different from a color of the touch screen.

Further, the second oblique edge parts have a color which is changed by electroplating and different from a color of the touch screen.

Further, the flexible circuit board is adhered to the touch screen by glue dispensing.

Further, the groove is formed by performing CNC machining on the touch screen.

Further, the groove is formed by etching the touch screen.

Compared with the prior art, the embedded fingerprint recognition device based on the mobile terminal provided by the present disclosure adopts the touch screen module. The touch screen module includes the touch screen. The touch screen has the groove defined therein. The touch screen module further includes the fingerprint recognition module embedded and disposed in the groove. As such, the fingerprint recognition module can be fit into the groove of the touch screen, and the influence of the body thickness of the fingerprint recognition module on the thickness of the mobile terminal and the length can be decreased. Moreover, it is simple and convenient to directly place and fix the fingerprint recognition module in the groove, thereby solving the problem that a thickness of a mobile terminal and a length are increased in the prior art because the conventional fingerprint recognition module is thicker and assembling is complicated.

DESCRIPTION OF SPECIFIC EMBODIMENTS OF THE INVENTION

The present disclosure provides an embedded fingerprint recognition device based on a mobile terminal and a manufacturing method thereof. To make the objectives, technical schemes, and technical effects of the present disclosure more clearly and definitely, the present disclosure will be described in details below by using embodiments in conjunction with the appending drawings. It should be understood that the specific embodiments described herein are merely for explaining the present disclosure, but is not intended to limit the present disclosure.

Figure 1:
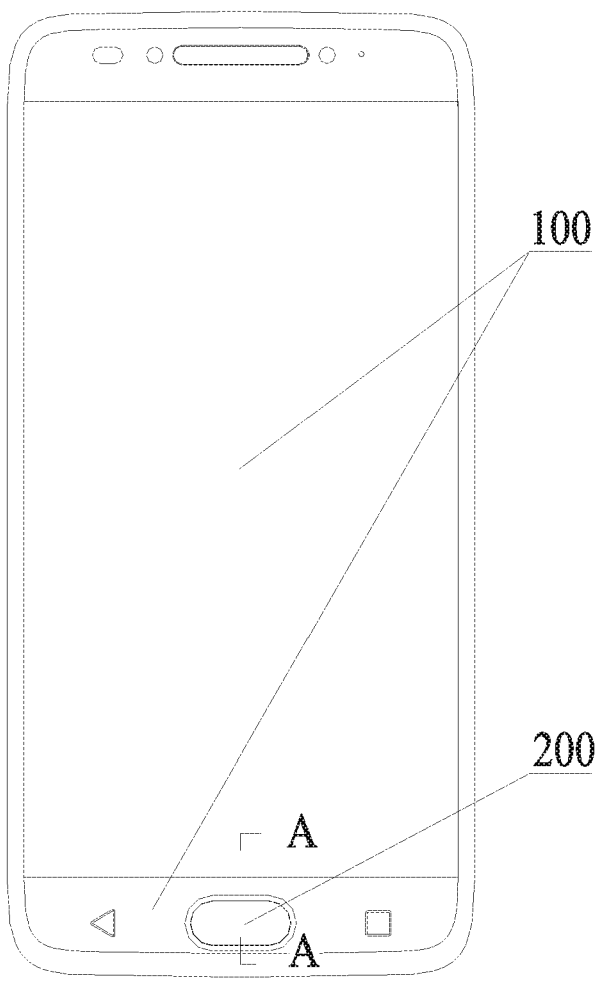
FIG. 1 illustrates a main diagram of an embedded fingerprint recognition device based on a mobile terminal of the present disclosure.
Figure 2:
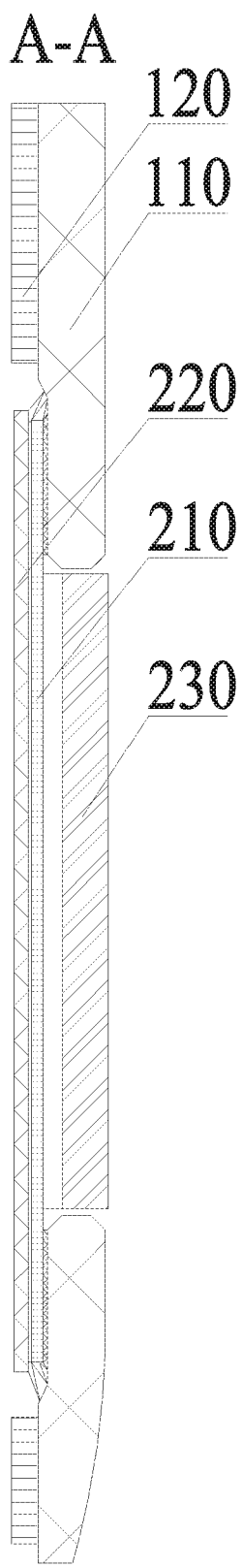
FIG. 2 illustrates a part sectional view of A-A in FIG. 1.

As shown in FIG. 1, the present disclosure provides an embedded fingerprint recognition device based on a mobile terminal including a touch screen module 100 and a fingerprint recognition module 200. The touch screen module 100 includes a touch screen 110. As shown in FIG. 2, the touch screen 110 has a groove 300 defined therein. The fingerprint recognition module 200 is embedded and disposed in the groove 300. The groove 300 is shown as FIG. 4.

In a preferred embodiment of the present disclosure, the touch screen 110 is a glass panel. A touch screen sensor 120 is attached to one side of the touch screen 110 near the mobile terminal. The groove 300 is formed by CNC (Computer Numerical Control) machining or etching using HF (sodium hydroxide). The process is simple, and the CNC machining and the HF etching technology are well developed, so that the machining accuracy can be ensured and the yield can be increased.

The embedded fingerprint recognition device based on the mobile terminal provided by the present disclosure adopts the touch screen module 100. The touch screen module 100 includes the touch screen 110. The touch screen 110 has the groove 300 defined therein. The touch screen module 100 further includes the fingerprint recognition module 200 embedded and disposed in the groove 300. As such, the fingerprint recognition module 200 can be fit into the groove 300 of the touch screen 110, and the influence of the body thickness of the fingerprint recognition module 200 on the thickness of the mobile terminal and the length can be decreased. Moreover, it is simple and convenient to directly place and fix the fingerprint recognition module 200 in the groove 300, thereby solving the problem that a thickness of a mobile terminal and a length are increased in the prior art because the conventional fingerprint recognition module is thicker and assembling is complicated.

Figure 4:
FIG. 4 illustrates a structural diagram of a groove in accordance with a preferred embodiment of the embedded fingerprint recognition device based on the mobile terminal of the present disclosure.

Further, as shown in FIG. 4, the groove 300 includes a first groove part 310 disposed in the one side of the touch screen 110 attached on the mobile terminal. The fingerprint recognition module 200 includes a flexible circuit board 210 disposed in the first groove part 310.

As shown in FIG. 2, the first groove part 310 places the flexible circuit board 210. Accordingly, the flexible circuit board 210 can be fixed to the touch screen 110 and placed in the first groove part 310 by a glue dispensing method (not shown in FIG. 2). The glue dispensing method is convenient and stable and has low cost.

Further, the fingerprint recognition module 200 includes a strengthening steel plate 220 attached to the flexible circuit board 210 to strengthen the flexible circuit board 210, so that the flexible circuit board 210 is not bent easily.

When the strengthening steel plate 220 is attached to the flexible circuit board 210, edge corners of the strengthening steel plate 220 are fixed to the touch screen 110 by a glue dispensing method. As such, the flexible circuit board 210 can be fixed by double protection, and connection stability is enhanced.

In a preferred embodiment of the present disclosure, as shown in FIG. 4, the groove 300 further includes a second groove part 320 disposed in the other side of the touch screen 110 away from the mobile terminal and connected to the first groove part 310. The fingerprint recognition module 200 further includes a fingerprint recognition sensor 230 disposed in the second groove part 320.

When the fingerprint recognition sensor 230 is implemented specifically, the fingerprint recognition sensor 230 is connected to the flexible circuit board 210. Based on the connection stability between the flexible circuit board 210 and the strengthening steel plate 220, stability of disposing the fingerprint recognition sensor 230 can be ensured, and this disposure can further simplify an assembling process of the embedded fingerprint recognition device based on the mobile terminal.

Figure 3:
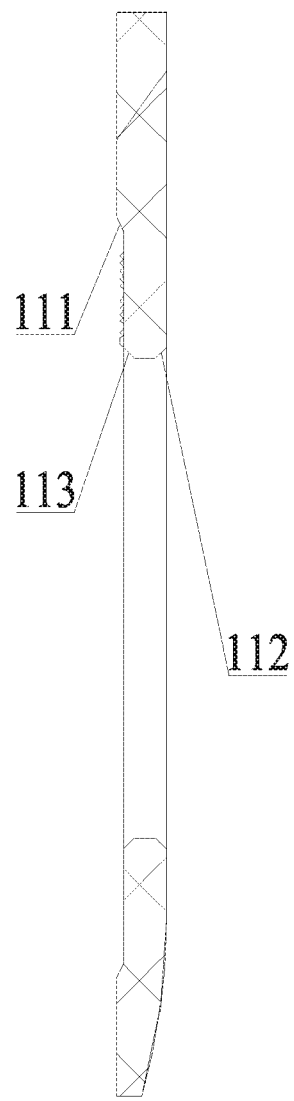
FIG. 3 illustrates a sectional view of a touch screen in FIG. 2.

Further, as shown in FIG. 3, the touch screen 110 includes first oblique edge parts 111 disposed therein, so that a shape of the first groove part 310 is a trapezoid having a long inner side and a short outer side in a longitudinal view.

The long inner side and the short outer side are described with respect to the mobile terminal and the embedded fingerprint recognition device based on the mobile terminal. That is, when the mobile terminal is placed horizontally, the shape of the first groove part 310 is an inverted isosceles trapezoid in a cross section due to the function of the first oblique edge parts 111.

By disposing the first oblique edge parts 111, it is convenient to process liquid glue when the flexible circuit board 210 is adhered by the glue dispensing method.

Further, as shown in FIG. 3, the touch screen 110 of the embedded fingerprint recognition device based on the mobile terminal further includes second oblique edge parts 112 disposed therein, so that the shape of the second groove part 320 is a trapezoid having a long inner side and a short outer side in the longitudinal view.

Positions of disposing the second oblique edge parts 112 and effect achieved by the second oblique edge parts 112 are the same as those of the first oblique edge parts 111, but the functions of the second oblique edge parts 112 are different from those of the first oblique edge parts 111. In one aspect, the second oblique edge parts 112 can prevent the edges of the glass panel from hurting a user or making the user uncomfortable. In another aspect, the second oblique edge parts 112 can beautify the mobile terminal.

Further, as shown in FIG. 3, the touch screen 110 of the embedded fingerprint recognition device based on the mobile terminal further includes third oblique edge parts 113 disposed therein and disposed symmetrically with the second oblique edge parts 112 in a horizontal direction.

Further, the second oblique edge parts 112 of the embedded fingerprint recognition device based on the mobile terminal can have color for implementing stereoscopic display effect by silk printing or electroplating.

The second oblique edge parts 112 may be processed to be silver when being implemented specifically. In the prior art, a metal decorative ring for fingerprint recognition is utilized. In the present disclosure, the metal decorative ring for fingerprint recognition can be replaced with a silk printed/transferred/electroplated decorative ring on an edge curve surface of the second groove part 320 (i.e., the second oblique edge parts 112), thereby implementing the stereoscopic display effect of a decorative ring.

In a manufacturing method of the above-mentioned embedded fingerprint recognition device based on the mobile terminal, the groove 300 is formed by performing CNC machining on the touch screen or etching the touch screen. Specific embodiments are described in the above-mentioned embodiments of the device.

The above description is merely the specific embodiments of the present disclosure, but the protection scope of the present disclosure is not limited thereto, any skilled who is familiar with this art could readily conceive variations or substitutions within the disclosed technical scope disclosed by the present disclosure, and these variations or substitutions shall be encompassed in the protection scope of the present disclosure. Thus, the protection scope of the present disclosure shall be subjected to the protection scope of the claims.

What is claimed is:

1. An embedded fingerprint recognition device based on a mobile terminal, comprising:
   a touch screen module comprising a touch panel, the touch panel comprising a groove defined therein, and a touch screen sensor attached to one side of the touch screen near the mobile terminal; and
   a fingerprint recognition module embedded and disposed in the groove;
   wherein the groove comprises a first groove part disposed in the one side of the touch screen attached on the mobile terminal, and the fingerprint recognition module comprises a flexible circuit board disposed in the first groove part;
   wherein the groove further comprises a second groove part disposed in the other side of the touch screen away from the mobile terminal and connected to the first groove part, and the fingerprint recognition module further comprises a fingerprint recognition sensor disposed in the second groove part;
   wherein a decorative ring is printed on the second groove part;
   wherein the touch screen comprises first oblique edge parts disposed therein, so that a shape of the first groove part is a trapezoid having a long inner side and a short outer side in a longitudinal view.

2. The embedded fingerprint recognition device based on the mobile terminal of claim 1, wherein the touch screen further comprises second oblique edge parts disposed therein, so that a shape of the second groove part is a trapezoid having a long inner side and a short outer side in the longitudinal view.

3. The embedded fingerprint recognition device based on the mobile terminal of claim 2, wherein the touch screen further includes third oblique edge parts disposed therein and disposed symmetrically with the second oblique edge parts in a horizontal direction.

4. An embedded fingerprint recognition device based on a mobile terminal, comprising:
   a touch screen module, the touch screen module comprising a touch panel, the touch panel comprising a groove defined therein; and
   a fingerprint recognition module embedded and disposed in the groove,
   wherein the groove comprises a first groove part disposed in one side of the touch screen attached on the mobile terminal;
   wherein the touch screen comprises first oblique edge parts disposed therein, so that a shape of the first groove part is a trapezoid having a long inner side and a short outer side in a longitudinal view.

5. The embedded fingerprint recognition device based on the mobile terminal of claim 4, wherein
   the fingerprint recognition module comprises a flexible circuit board disposed in the first groove part.

6. The embedded fingerprint recognition device based on the mobile terminal of claim 5, wherein the fingerprint recognition module further comprises a strengthening steel plate attached to the flexible circuit board.

7. The embedded fingerprint recognition device based on the mobile terminal of claim 6, wherein the groove further comprises a second groove part disposed in the other side of the touch screen away from the mobile terminal and connected to the first groove part;
   the fingerprint recognition module further comprises a fingerprint recognition sensor disposed in the second groove part.

8. The embedded fingerprint recognition device based on the mobile terminal of claim 7, wherein the touch screen further comprises second oblique edge parts disposed therein, so that a shape of the second groove part is a trapezoid having a long inner side and a short outer side in the longitudinal view.

9. The embedded fingerprint recognition device based on the mobile terminal of claim 8, wherein the touch screen further includes third oblique edge parts disposed therein and disposed symmetrically with the second oblique edge parts in a horizontal direction.

10. The embedded fingerprint recognition device based on the mobile terminal of claim 8, wherein the second oblique edge parts have a color which is changed by silk printing and different from a color of the touch screen.

11. The embedded fingerprint recognition device based on the mobile terminal of claim 8, wherein the second oblique edge parts have a color which is changed by electroplating and different from a color of the touch screen.

12. The embedded fingerprint recognition device based on the mobile terminal of claim 5, wherein the flexible circuit board is adhered to the touch screen by glue dispensing.

13. The embedded fingerprint recognition device based on the mobile terminal of claim 4, wherein the groove is formed by performing CNC machining on the touch screen.

14. The embedded fingerprint recognition device based on the mobile terminal of claim 4, wherein the groove is formed by etching the touch screen.

* * * * *